(12) United States Patent
Stanic

(10) Patent No.: US 11,447,046 B2
(45) Date of Patent: Sep. 20, 2022

(54) GEARING ARRANGEMENT FOR A SPINDLE DRIVE, SPINDLE DRIVE, AND VEHICLE SEAT

(71) Applicant: ADIENT ENGINEERING AND IP GMBH, Burscheid (DE)

(72) Inventor: Ivica Stanic, Dormagen (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 801 days.

(21) Appl. No.: 16/339,845

(22) PCT Filed: Oct. 10, 2017

(86) PCT No.: PCT/EP2017/075769
§ 371 (c)(1),
(2) Date: Apr. 5, 2019

(87) PCT Pub. No.: WO2018/069292
PCT Pub. Date: Apr. 19, 2018

(65) Prior Publication Data
US 2020/0047646 A1    Feb. 13, 2020

(30) Foreign Application Priority Data
Oct. 10, 2016   (DE) ............... 10 2016 219 598.0

(51) Int. Cl.
*B60N 2/23*    (2006.01)
*F16H 25/20*   (2006.01)
*H02K 7/116*   (2006.01)

(52) U.S. Cl.
CPC ........... *B60N 2/232* (2013.01); *F16H 25/20* (2013.01); *H02K 7/116* (2013.01)

(58) Field of Classification Search
CPC ........ B60N 2/233; B60N 2/232; B60N 2/929; H02K 7/116; F16H 25/20
See application file for complete search history.

(56) References Cited

FOREIGN PATENT DOCUMENTS

| CN | 105358368 A | 2/2016 |
|---|---|---|
| CN | 105960353 A | 9/2016 |
| DE | 102005046356 A1 | 3/2007 |

(Continued)

OTHER PUBLICATIONS

China National Intellectual Property Administration. Office Action in Application No. CN201780062360.6, dated Nov. 30, 2020, 9 pages.

(Continued)

*Primary Examiner* — Milton Nelson, Jr.
(74) *Attorney, Agent, or Firm* — Marshall & Melhorn, LLC

(57) ABSTRACT

A gearing arrangement (3), for a spindle drive (1), includes a gearing holder (11). At least one pivot axle (y), about which the spindle drive (1) is rotatably and/or pivotably mountable or mounted, and/or at least one receptacle for the at least one pivot axle (y), is formed at least by the gearing housing (4). The gearing holder (11), or the gearing arrangement (3) includes a component group which, as components, includes a gearing housing (4), a gearing holder (11) and a gearing cover (10). At least one pivot axle (y), about which the spindle drive (1) is rotatably and/or pivotably mountable or mounted, is formed by at least one of the components of the component group. At least one receptacle, for the at least one pivot axle (y), is formed by at least one other of the components of the component group.

9 Claims, 6 Drawing Sheets

(56) References Cited

FOREIGN PATENT DOCUMENTS

| | | |
|---|---|---|
| DE | 102006009576 A1 | 9/2007 |
| DE | 10 2012 106 196 B3 | 5/2014 |
| DE | 102012106196 B3 | 5/2014 |
| EP | 0627996 A1 | 12/1994 |
| JP | 2005238879 A | 9/2005 |
| WO | 8606036 A1 | 10/1986 |
| WO | 03/068551 A1 | 8/2003 |
| WO | 2015/113929 A1 | 8/2015 |

OTHER PUBLICATIONS

European Patent Office, Office Action in application No. EP17 781 126.2, dated Nov. 25, 2020, 7 pages.

GEARING ARRANGEMENT FOR A SPINDLE DRIVE, SPINDLE DRIVE, AND VEHICLE SEAT

CROSS REFERENCE TO RELATED APPLICATIONS

This application is a United States National Phase Application of International Application PCT/EP2017/075769 filed Oct. 10, 2017, and claims the benefit of priority under 35 U.S.C. § 119 of German Application 10 2016 219 598.0, filed Oct. 10, 2016, the entire contents of which are incorporated herein by reference.

TECHNICAL FIELD

The invention relates to a gearing arrangement for a spindle drive comprising a gear housing, such as a spindle drive having a component group, which comprises as components a gear housing, a gear holder and a gear cover. The invention further relates to a vehicle seat having such a spindle drive.

TECHNICAL BACKGROUND

From the prior art, spindle drives, for example, for an adjustment mechanism of a vehicle, are generally known. Such adjustment mechanisms are, for example, used for an electrical height adjustment of a vehicle seat. Such spindle drives comprise an electric motor and a gearing arrangement by means of which a rotation movement of the electric motor is transmitted to a threaded spindle of the spindle drive. The spindle drive makes it possible for a rotational movement of the electric motor to be converted by the gearing arrangement into a translational movement.

DE 10 2012 106 196 B3 describes an adjustment drive for a motor vehicle seat. The adjustment drive comprises a drive unit which is supported on a housing, a spindle nut which is arranged inside the housing and which can be driven by the drive unit, a threaded spindle which is arranged on the spindle nut and which can be adjusted with respect to the housing in the longitudinal axis direction and a cage which at least partially surrounds the housing. The housing is connected to the cage in an articulated manner and is guided in abutment with the cage by means of a support element which is arranged on the housing. In the region between the spindle nut and the support element, in order to secure the housing relative to the cage, a spacer element which is axially in abutment with a stop face against the spindle nut and which can be adjusted axially relative to the spindle nut with respect to the support element by means of a screw thread is arranged.

SUMMARY

An object of the present invention is to provide a gearing arrangement for a spindle drive which is improved with respect to the prior art, a spindle drive which is improved with respect to the prior art and a vehicle seat which is improved with respect to the prior art.

The object is consequently achieved according to the invention by a gearing arrangement for a spindle drive which comprises a gear housing, a gear holder and, in a possible embodiment, a gear cover, wherein at least one pivot axle, about which the spindle drive can be or is rotatably and/or pivotably supported, and/or at least one receiving member for the at least one pivot axle is formed by the gear housing, the gear cover and the gear holder or at least by the gear housing and the gear holder.

In this instance, there may also be provision for the at least one pivot axle to be formed by means of at least one of the mentioned components and the at least one receiving member to be formed by means of at least one other of the mentioned components which advantageously cooperate. That is to say, in this, for example, alternative embodiment according to the invention, the gearing arrangement for the spindle drive comprises a component group which comprises as components the gear housing, the gear holder and the gear cover, wherein at least the at least one pivot axle, about which the spindle drive can be or is rotatably and/or pivotably supported, is formed by at least one of the components of this component group and the at least one receiving member for the at least one pivot axle is formed by means of at least one other of the components of this component group, wherein there is provision in one embodiment for the at least one component of the component group which forms the at least one pivot axle and the at least one other component of this component group which forms the at least one receiving member for the at least one pivot axle to cooperate, for example, as securing elements for these components with respect to each other.

In solutions known from the prior art, only the gear holder or additional components of the rotatable and/or pivotable bearing of the spindle drive are used. A correspondingly stable construction of the gear holder and/or the additional components and a correspondingly stable connection between the gear holder and/or the additional components and the gear housing are thereby required. With the solution according to the invention, the gear holder, the gear housing and the gear cover or at least the gear holder and the gear housing are incorporated in the implementation of the rotatable and/or pivotable bearing so that bearing forces can be distributed over these components.

As a result of the solution according to the invention, an optimization of structural space, weight and assembly and a cost reduction and improvement of the degree of efficiency with spindle drives which the gearing arrangement according to the invention have are achieved. In particular, as a result of the solution according to the invention, a stable bearing of the spindle drive is achieved.

Another advantage of the solution according to the invention involves the gear cover being loaded only in terms of pressure via the gear spindle and a worm wheel in a main load direction. Therefore, no fixed connection between the gear cover and gear housing or between the gear cover and gear holder has to be produced. The gear cover or at least an outer side of the gear cover can in order to carry out the rotation and/or pivot movement about the pivot axle be constructed, for example, in a concave or convex manner.

The object is further achieved, as already mentioned above, according to the invention by a spindle drive having such a gearing arrangement and a vehicle seat having such a spindle drive, whereby the advantages already mentioned above also apply to the spindle drive and the vehicle seat with this spindle drive. Such a spindle drive, for which the gearing arrangement is provided, is, for example, suitable for an adjustment mechanism of a vehicle. Such adjustment mechanisms are, for example, used for an electrical height adjustment of the vehicle seat of the vehicle.

In an embodiment, the gear cover or at least an outer side of the gear cover for carrying out the rotational and/or pivot movement about the pivot axle is constructed to be concave or convex in order not to impede this pivot movement since, as a result of this construction of the gear cover, for example, an impact against another component during the pivot movement is prevented.

In an embodiment, the gearing arrangement or at least the spindle drive comprises a threaded spindle in order to convert a rotational movement, for example, of an electric motor of the spindle drive, into a translational movement.

In an embodiment, the gearing arrangement comprises at least one pin. The at least one pin is, for example, constructed as a component of the gear housing, the gear holder and/or the gear cover thereon or constructed as an additional component which is in particular independent thereof. After an assembly of the spindle drive and the assembly thereof on the vehicle seat and/or on a frame of the vehicle seat and/or on the vehicle, the gear housing, the gear cover and the gear holder or, for example, at least the gear housing and the gear holder and thereby the entire spindle drive, are consequently rotatably and/or pivotably retained on the vehicle seat by means of the at least one pin. The at least one pin or a plurality of such pins form(s), for example, the pivot axle.

If the at least one pin is constructed as a component of the gear housing, the gear holder and/or the gear cover, it is, for example, constructed integrally and/or in one piece with at least one of the components mentioned. For example, two or more such pins may also be provided. For example, the pin(s) is/are formed on the gear holder.

There may also be provision for the at least one pin or a plurality of such pins or one or more other components which can be used as a pivot axle to be formed on at least one of the components mentioned, that is to say, on the gear housing, gear cover or gear holder (that is to say, on at least one of the components of the above-mentioned component group) and for the receiving member for the pivot axle to be formed on at least one other of these components (that is to say, on at least one other of the components of the above-mentioned component group). The pivot axle which is constructed, for example, as one or more pins, then serves, for example, to connect these parts (that is to say, these components), for example, to connect the gear housing to the gear holder and additionally to rotatably and/or pivotably support the gearing arrangement and thereby the spindle drive.

In an embodiment, the spindle drive comprises an electric motor. This is a suitable drive in particular for use in a vehicle, in particular in an inner space of a vehicle, for example, on the vehicle seat.

Embodiments of the invention are explained in greater detail with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
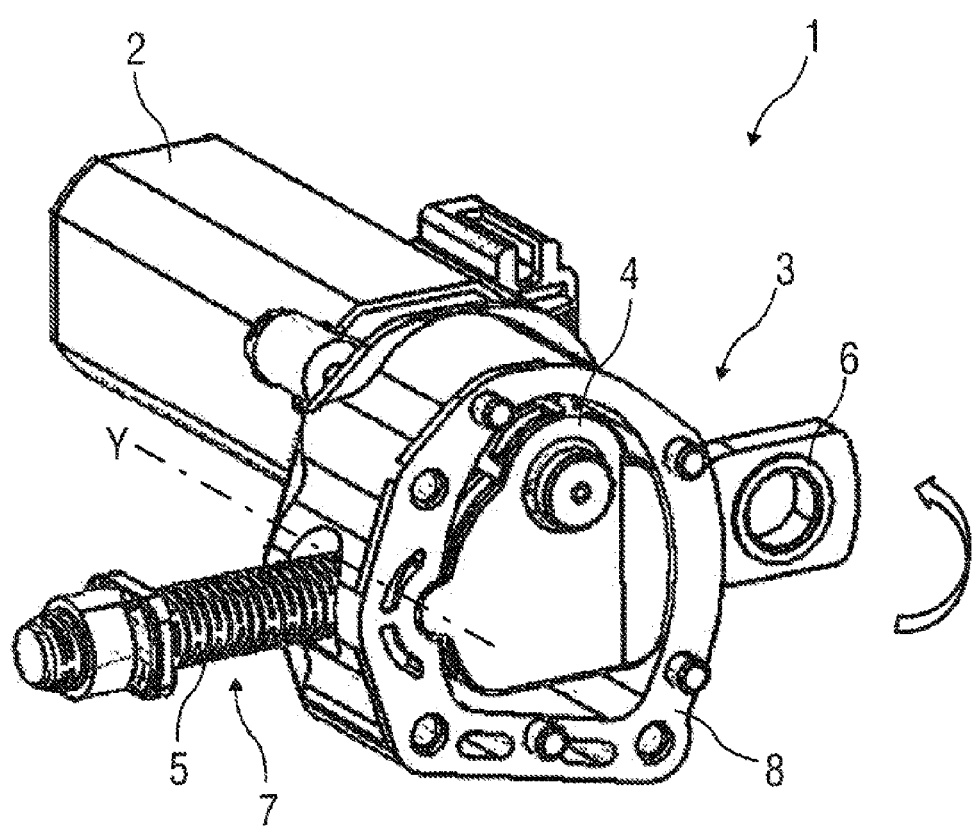
FIG. 1 is a schematic, perspective illustration of an embodiment of a spindle drive known from the prior art.

Referring to the drawings, corresponding components are given the same reference numerals in all the Figures.

Figure 2:
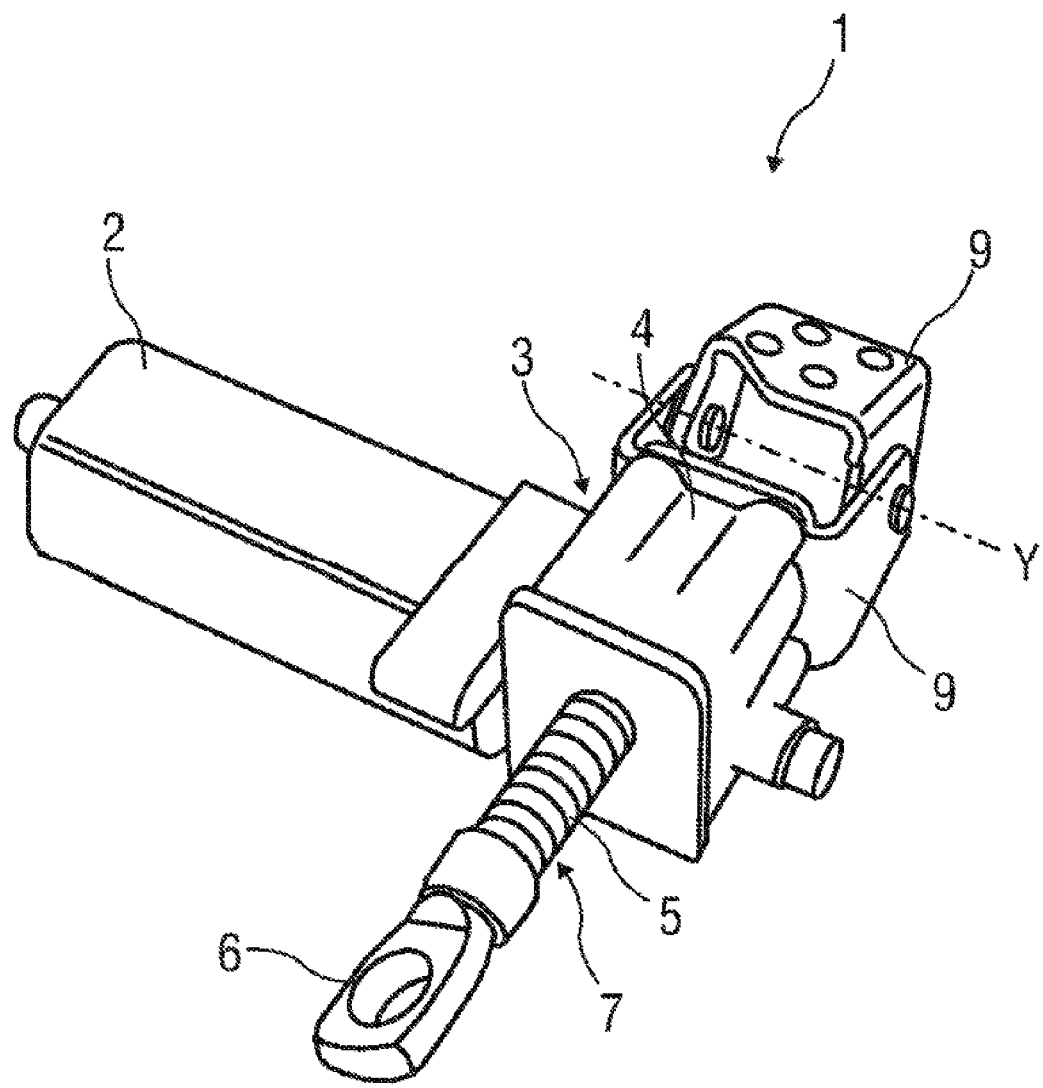
FIG. 2 is a schematic, perspective illustration of another embodiment of a spindle drive known from the prior art.

FIGS. 1 and 2 show embodiments of a spindle drive 1 known from the prior art. FIGS. 3 to 6 show improved embodiments of such a spindle drive 1, for example, for an adjustment mechanism of a vehicle which is not illustrated in this instance, for example, for an electric height adjustment of a vehicle seat 13 of the vehicle illustrated in FIG. 7.

The spindle drive 1 comprises in all the embodiments illustrated an electric motor 2 and a gearing arrangement 3 having a gear mechanism which is arranged in a gear housing 4 and which advantageously comprises a worm wheel. The electric motor 2 is coupled by means of the gear mechanism, advantageously by means of the worm wheel thereof, to a threaded spindle 5. Via the gear mechanism, advantageously via the worm wheel thereof, a rotational movement of the electric motor 2 can be transmitted to the gear spindle 5. As a result of the spindle drive 1, it is possible to convert a rotational movement of the electric motor 2 via the gear mechanism into a translational movement of the threaded spindle 5.

If the spindle drive 1 is used to adjust the height of the vehicle seat 13, the spindle drive 1 is advantageously secured to a portion of the vehicle seat 13 and an end of the threaded spindle 5 is secured to a portion of the vehicle seat 13 which can be moved relative thereto, for example, to a frame portion of the vehicle seat 13. Advantageously, for this purpose this end of the threaded spindle 5 has a securing element 6 which, for example, as shown in FIGS. 1 to 3 and 5 and 6, is constructed in the form of a securing lug.

In the embodiments illustrated in this instance, there is provision for the threaded spindle 5 to be constructed as a non-rotating threaded spindle 5, that is to say, the gear mechanism acts as a result of a rotational movement of the electric motor 32, advantageously via the worm wheel, in such a manner on a thread 7 of the threaded spindle 5 that it carries out a translational movement in the direction of the longitudinal axis thereof, wherein the threaded spindle 5 does not rotate about the longitudinal axis thereof. In this instance, a rotational movement of the electric motor 2 in a rotation direction leads to a translational movement of the threaded spindle 5 in one direction and a rotational movement of the electric motor 2 in the opposite rotation direction leads to a corresponding translational movement of the threaded spindle 5 in the opposite direction, that is to say, the threaded spindle 5 moves, depending on the rotation direction of the electric motor 2, forwards and back again. As a result of a corresponding coupling to the vehicle seat 13, the use of the spindle drive 1 in an adjustment mechanism for electrical height adjustment of the vehicle seat 13 results in a corresponding height change of the vehicle seat 13.

With such an adjustment mechanism, there is provision for the spindle drive 1 to be supported on the vehicle seat 13 in such a manner that it can be or is rotatably and/or pivotably supported about a pivot axle y, advantageously on the vehicle seat 13 and/or a frame of the vehicle seat 13, via which the vehicle seat 13 is secured or can be secured to the vehicle and which is advantageously a component of the adjustment mechanism. The pivot and/or rotational movement of the spindle drive results from the height change of the vehicle seat 13 and consequently the end of the threaded spindle 5 which is arranged thereon, whilst the spindle drive 1 is supported via the pivot axle y on the portion of the vehicle seat 33, advantageously the frame, which is not involved in this height change or which carries it out to another extent. A transposed arrangement of the end of the threaded spindle 5 and the spindle drive 1 via the pivot axle y is also possible.

Figure 3:
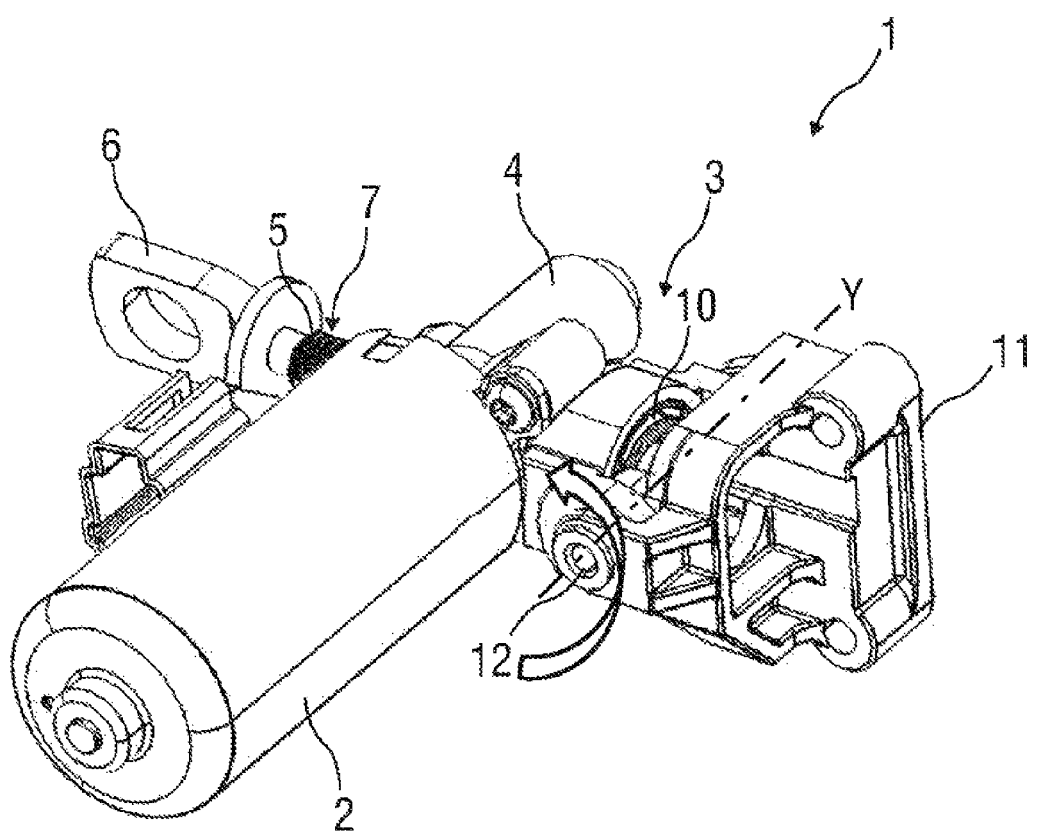
FIG. 3 is a schematic, perspective illustration of an embodiment of a spindle drive.
Figure 4:
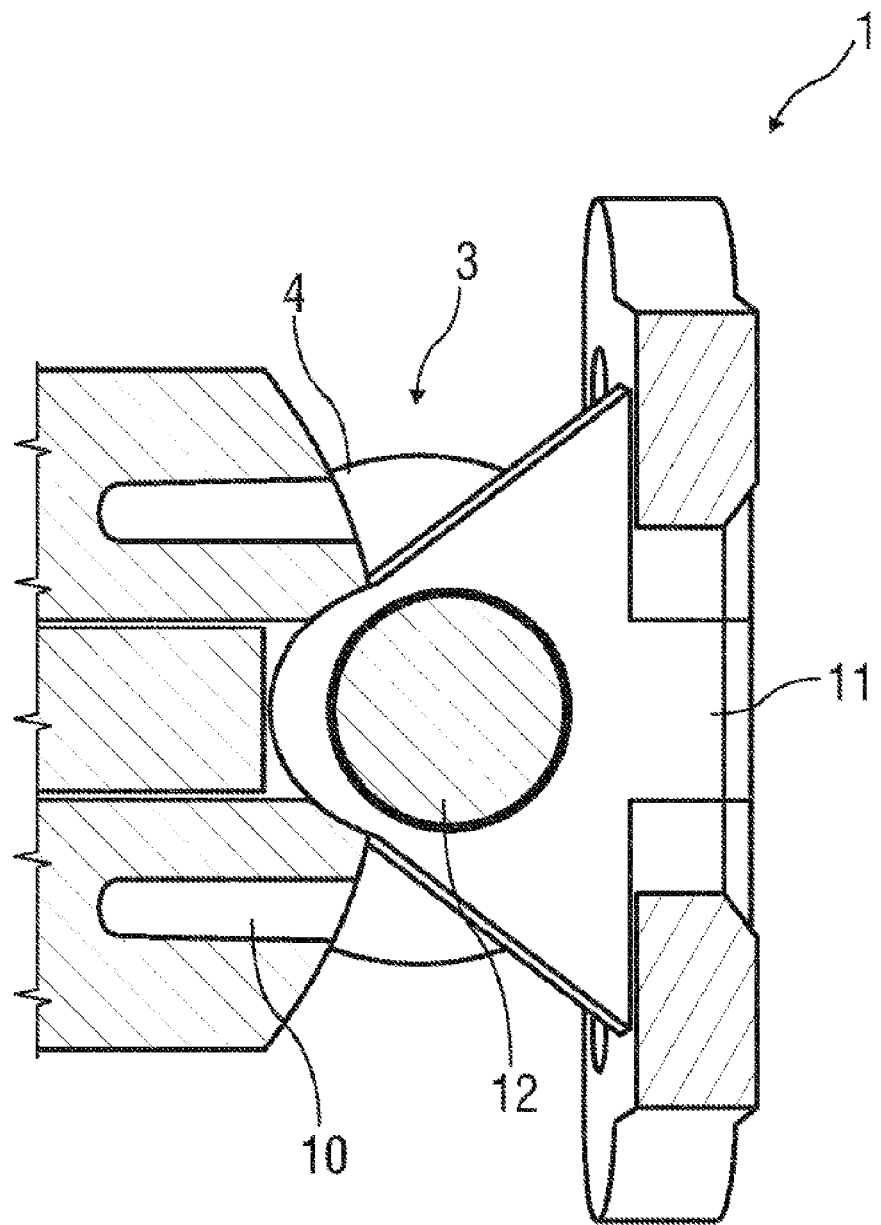
FIG. 4 is a schematic illustration of a region of the embodiment of the spindle drive illustrated in FIG. 3.

This pivot axle y, also referred to as a rotation axle or rotary axle, is with a vehicle seat 13 which is arranged in the vehicle and which is orientated in the travel direction or counter to the travel direction advantageously orientated parallel with a Y axis of the vehicle, that is to say, parallel with a transverse axis of the vehicle. In FIGS. 1 to 3, this pivot axle y or at least the path thereof is indicated with a dot-dash line.

The spindle drive 1 which is illustrated in FIG. 1 and which is known from the prior art is constructed as a so-called cage spindle drive. In this instance, a cage 8 is used to retain the gear mechanism with the gear housing 4 thereof and thereby to retain the entire spindle drive 1 on the vehicle seat 13. The cage 8 also has in this instance the pivot axle y. However, the resulting disadvantages of this are an unstable bearing and a large requirement for structural space.

FIG. 2 shows another embodiment of a spindle drive 1 which is known from the prior art and in which the pivot axle y is constructed as an external pivot axle y by means of additional connection components 9. These additional connection components 9 result in additional material and assembly costs, a high level of assembly complexity, also a high structural space requirement and in addition a high weight. In addition, a complex connection of the correct strength between the gear housing 4 and a gear cover and between the gear housing 4 and a gear holder is required.

In the embodiments of the spindle drive 1 which are illustrated in FIGS. 3 to 6 and which are significantly more advantageous than the spindle drives 1 known from the prior art, the spindle drive 1 comprises in each case the electric motor 2 and the gearing arrangement 3, which comprises the gear mechanism with the gear housing 4, a gear cover 10 and a gear holder 11. In this instance, there is provision for at least one pivot axle y, about which the spindle drive 1 can be or is rotatably and/or pivotably supported, and/or at least one receiving member for the at least one pivot axle y to be formed by the gear housing 4, the gear cover 10 and the gear holder 11 or at least by the gear housing 4 and the gear holder 11.

That is to say, the gearing arrangement 3 is constructed in such a manner that the gear housing 4, the gear cover 10 and the gear holder 11 or at least the gear housing 4 and the gear holder 11 are constructed and positioned relative to each other in such a manner that the gear housing 4, the gear cover 10 and the gear holder 11 or at least the gear housing 4 and the gear holder 11 together form the at least one pivot axle y and/or the at least one receiving member for the at least one pivot axle y.

After the assembly of the spindle drive 1 and the assembly thereof on the vehicle seat 13 and/or frame of the vehicle seat 13 and/or vehicle, the gear housing 4, the gear cover 10 and the gear holder 11 or at least the gear housing 4 and the gear holder 11 and thereby the entire spindle drive 1 are consequently, for example, by means of at least one pin 12, rotatably and/or pivotably retained on the vehicle seat 13.

The at least one pin 12 or a plurality of such pins 12 advantageously form(s) in this instance the pivot axle y.

Figure 5:
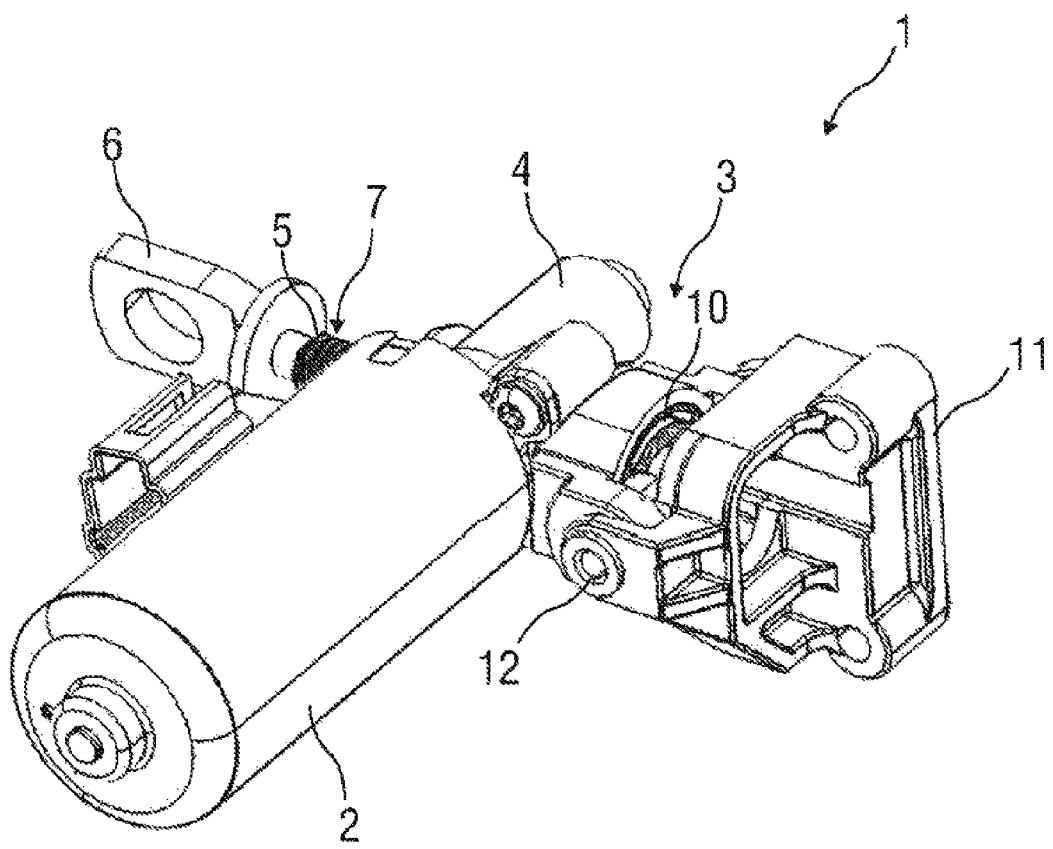
FIG. 5 is a schematic, perspective illustration of an embodiment of a spindle drive.

In the embodiment according to FIG. 5, this at least one pin 12 is constructed as an additional component. In other embodiments, this at least one pin 12 is constructed, for example, as a component of the gear housing 4, the gear holder 11 and/or the gear cover 10. For example, it is constructed integrally and/or in one piece with at least one of the components mentioned. In the embodiment according to FIG. 6, two such pins 12 are thus constructed on the gear holder 11.

There may also be provision for the at least one pin 12 or a plurality of such pins 12 or one or more other components which can be used as a pivot axle y to be constructed on at least one of the mentioned components, that is to say, on the gear housing 4, the gear cover 10 or gear holder 11, and for the receiving member for the pivot axle y to be constructed on at least one other of these components. The pivot axle y which is constructed, for example, as one or more pins 12, then serves, for example, to connect these components, for example, to connect the gear housing 4 to the gear holder 11, and additionally to rotatably and/or pivotably support the gearing arrangement 3 and thereby the spindle drive 1.

As a result of these advantageous embodiments of the gearing arrangement 3 and the spindle drive 1, in particular according to FIGS. 3 to 6, a stable bearing of the spindle drive 1 is achieved. In addition, a smaller structural space requirement, lower material and assembly costs, a lower level of assembly complexity and a lower weight are achieved.

Another advantage of this solution involves the gear cover 10 being loaded only in terms of pressure via the threaded spindle 5 and the worm wheel in a main load direction. The main load direction extends in this instance parallel with the longitudinal axis and consequently the translational movement direction of the threaded spindle 5. Therefore, no fixed connection between the gear cover 10 and the gear housing 4 or between the gear cover 10 and gear holder 11 has to be produced since the gear cover 10 is arranged in this main load direction between the gear housing 4 and the gear holder 11 and/or the pivot axle y which is formed, for example, by means of one or more pins 12 and is consequently retained in its position by the gear housing 4, on the one hand, and by the gear holder 11 and/or the pivot axle y, on the other hand.

The gear cover 10 or at least an outer side of the gear cover 10, in order to carry out the rotational and/or pivot movement about the pivot axle y, may be constructed to be, for example, concave or convex, in particular concave or convex in the direction of the gear holder 11. Sufficient free space is thereby provided for the pivot axle y.

Figure 6:
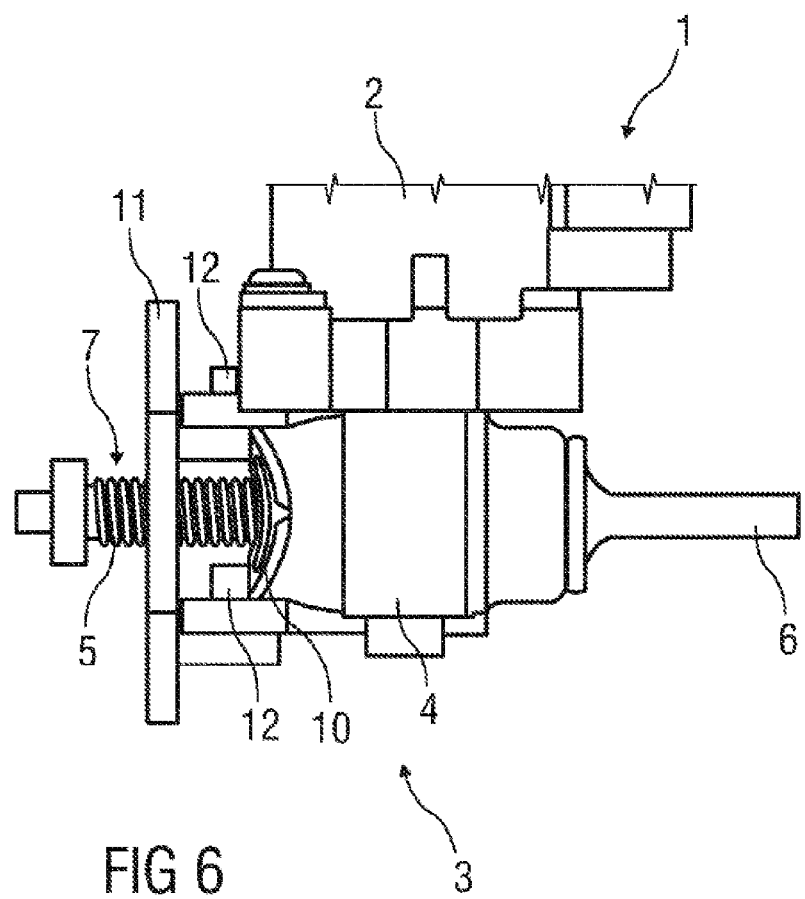
FIG. 6 is a schematic illustration of an embodiment of a spindle drive.
Figure 7:
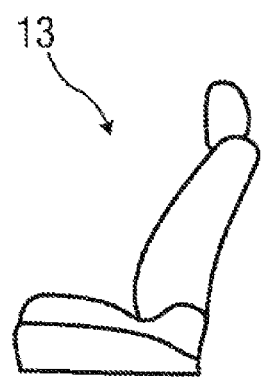
FIG. 7 is a schematic illustration of a vehicle seat.

As can be seen in FIG. 6, the outer side of the gear cover 10 is constructed to be concave in this instance in order to provide the free space for the pivot axle y formed by the pins 12. An inner side of the gear cover 10 which cannot be seen in this instance may, for example, be constructed to be correspondingly convex or planar or also concave or in another form.

While specific embodiments of the invention have been shown and described in detail to illustrate the application of the principles of the invention, it will be understood that the invention may be embodied otherwise without departing from such principles.

The invention claimed is:

1. A gearing arrangement, comprising:
   a gear housing;
   a gear holder;

at least one pivot axle comprising two pins being formed as a component of the gear holder on the latter, so that the pivot axle is formed by the gear holder; and, at least one receiving member for receiving the at least one pivot axle, the at least one receiving member being formed by the gear housing.

2. The gearing arrangement as claimed in claim 1, further comprising a gear cover.

3. The gearing arrangement as claimed in claim 2, wherein the gear cover or at least an outer side of the gear cover is constructed to be concave or convex.

4. A spindle drive, comprising:
a gearing arrangement,
a threaded spindle operatively connected to the gearing arrangement and
an electric motor operatively connected to the gearing arrangement,
the gearing arrangement, comprising:
a gear housing;
a gear holder;
at least one pivot axle, about which the spindle drive is rotatably or pivotably supported, the at least one pivot axle comprises two pins being formed as a component of the gear holder on the latter, so that the pivot axle is formed by the gear holder; and
at least one receiving member for receiving the at least one pivot axle, the at least one receiving member being formed by the gear housing.

5. The spindle drive as claimed in claim 4, further comprising a gear cover.

6. The spindle drive as claimed in claim 5, wherein the gear cover or at least an outer side of the gear cover is constructed to be concave or convex.

7. A vehicle seat, comprising:
at least one spindle drive, comprising:
a gearing arrangement,
a threaded spindle operatively connected to the gearing arrangement and
an electric motor operatively connected to the gearing arrangement,
the gearing arrangement, comprising:
a gear housing;
a gear holder;
at least one pivot axle, about which the spindle drive is rotatably or pivotably supported, the at least one pivot axle comprises two pins being formed as a component of the gear holder on the latter, so that the pivot axle is formed by the gear holder; and
at least one receiving member for receiving the at least one pivot axle, the at least one receiving member being formed by the gear housing.

8. The vehicle seat as claimed in claim 7, further comprising a gear cover.

9. The vehicle seat as claimed in claim 8, wherein the gear cover or at least an outer side of the gear cover is constructed to be concave or convex.

* * * * *